(12) United States Patent
Takasaka et al.

(10) Patent No.: US 8,438,585 B2
(45) Date of Patent: May 7, 2013

(54) DRIVE DEVICE FOR OPTICAL DISC APPARATUS

(75) Inventors: Daisuke Takasaka, Osaka (JP); Tetsuya Tamura, Osaka (JP); Masaki Nakatani, Osaka (JP); Katsuo Ichinohe, Osaka (JP); Rikiya Ueshima, Osaka (JP); Tomohiro Kobayashi, Osaka (JP); Yoshiyuki Nakagawa, Osaka (JP); Yasuhide Mizuta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/366,554

(22) Filed: Feb. 6, 2012

(65) Prior Publication Data

US 2012/0204194 A1 Aug. 9, 2012

(30) Foreign Application Priority Data

Feb. 7, 2011 (JP) ................. 2011-024478

(51) Int. Cl.
*G11B 21/02* (2006.01)

(52) U.S. Cl.
USPC ....................................... 720/672

(58) Field of Classification Search ........... 720/672
See application file for complete search history.

(56) References Cited

U.S. PATENT DOCUMENTS

| | | | |
|---|---|---|---|
| 5,754,022 A | 5/1998 | Uehara et al. | |
| 6,414,933 B1 * | 7/2002 | Anada et al. | 720/672 |
| 6,724,714 B1 * | 4/2004 | Kato et al. | 720/672 |
| 8,028,309 B2 * | 9/2011 | Lin et al. | 720/677 |
| 8,146,115 B2 * | 3/2012 | Hsu | 720/671 |
| 2006/0080690 A1 * | 4/2006 | Wu | 720/675 |
| 2009/0147662 A1 | 6/2009 | Ando | |
| 2009/0249379 A1 * | 10/2009 | Oshima et al. | 720/672 |

FOREIGN PATENT DOCUMENTS

| | | |
|---|---|---|
| JP | 06-133491 | 5/1994 |
| JP | 9-213027 | 8/1997 |
| JP | 2002-152941 | 5/2002 |
| JP | 2008-210440 | 9/2008 |
| JP | 2008-210442 | 9/2008 |
| JP | 2008-257826 | 10/2008 |
| JP | 2009-140547 | 6/2009 |

OTHER PUBLICATIONS

Office Action dated Dec. 18, 2012 for corresponding JP Application No. 2011-024478.

* cited by examiner

*Primary Examiner* — Mark Blouin
(74) *Attorney, Agent, or Firm* — Morgan, Lewis & Bockius LLP

(57) ABSTRACT

A drive device for an optical disc apparatus, wherein the tooth comprises a tooth body fixed to an optical pickup; support pieces projecting from the tooth body toward a lead screw; resin spring pieces extending from the support pieces in a direction orthogonal to the axial direction of the lead screw; a plate part formed in a direction parallel to the axial direction of the lead screw from the resin spring pieces; meshing cogs formed on the plate part on the side near the lead screw; a cover projecting above the lead screw from the plate part disposed above the meshing cogs, straddling the lead screw, and bending sharply downward at the distal end; and a handle projecting from the tooth body.

3 Claims, 36 Drawing Sheets

11

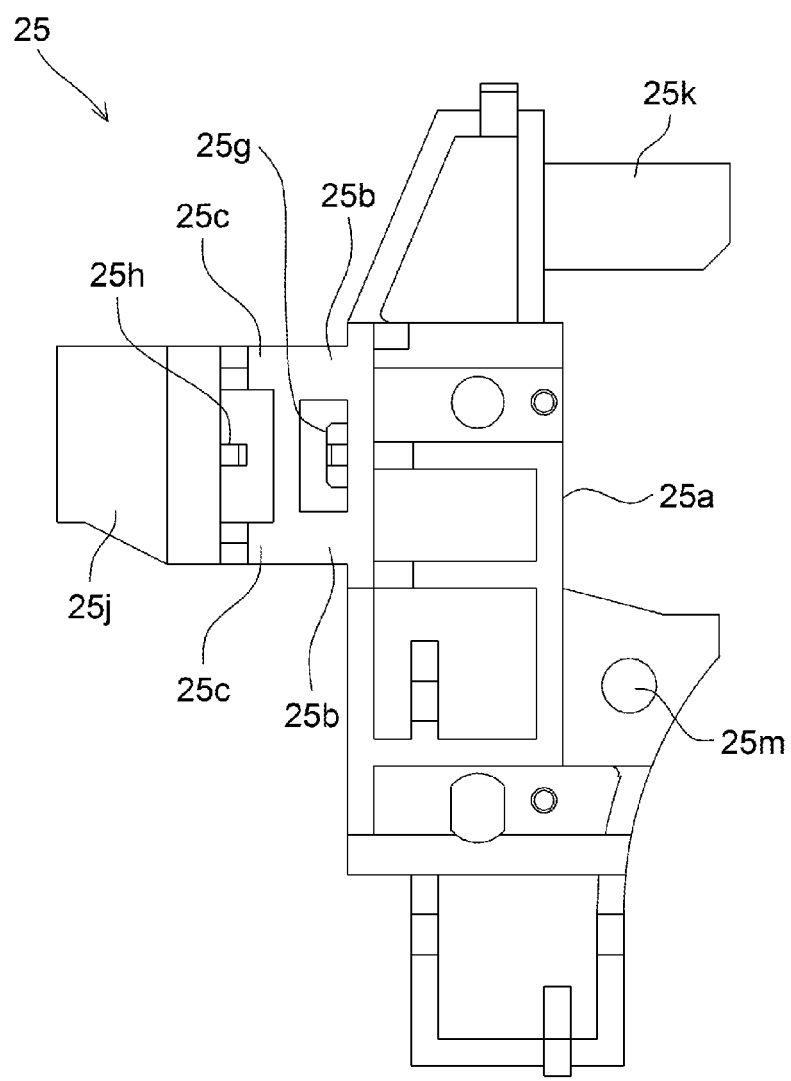

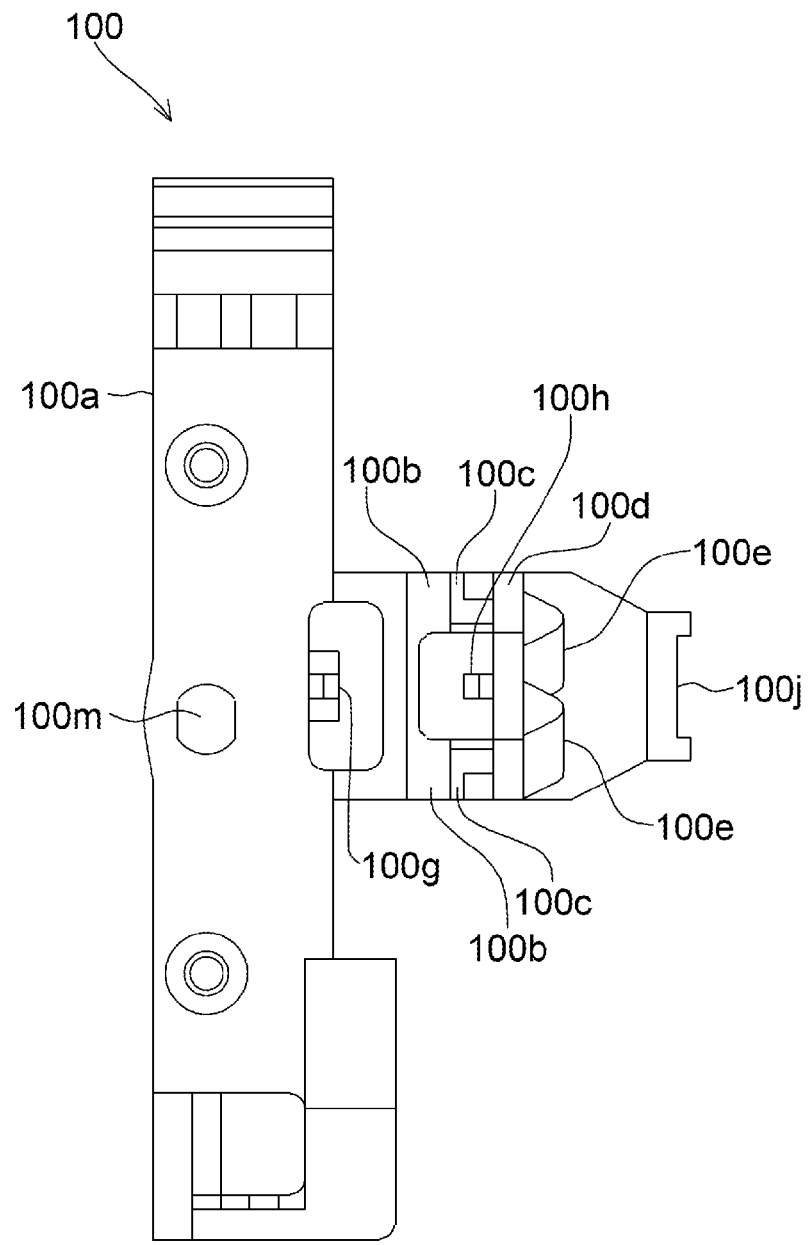

DRIVE DEVICE FOR OPTICAL DISC APPARATUS

This application is based on Japanese Patent Application No. 2011-024478 filed on Feb. 7, 2011, the contents of which are hereby incorporated by reference.

BACKGROUND OF THE INVENTION

1. Field of the Invention

The present invention relates to a drive device for an optical disc apparatus for recording on or playing a CD, DVD, BD (Blu-ray Disc), or other optical disc.

2. Description of Related Art

Optical pickup feeding devices provided in drive devices for general optical disc apparatuses comprise a lead screw and a resin tooth that is advanced following the rotation of the lead screw while being in meshed engagement with the lead screw. The tooth is further attached to an optical pickup that can move along a guide shaft, is extended in a cantilevered state in a direction orthogonal to the axis line of the lead screw, and is provided with a tooth spring for elastically urging the tooth from a back part and urging meshing cogs thereof in the direction of meshing with the lead screw. Various improvements to the mechanisms of such optical disc apparatuses have also been proposed in recent years.

For example, there is disclosed in Japanese Laid-open Patent Publication No. 2009-140547 a configuration of a disc device comprising an optical pickup for scanning the recording surface of a disc, and a power transmission mechanism provided with a screw shaft and a moveable unit in the form of a resin molding that has meshing cogs in meshed engagement with the screw shaft, the moveable unit of the power transmission mechanism being joined to the optical pickup and constituting part of the optical pickup, and a guide shaft for defining the pathway of the optical pickup being attached to a frame; wherein a stop received by a catch on the frame to stop the uncontrolled movement of the optical pickup when the optical pickup starts to move uncontrollably is provided to a cantilevered spring piece extending from the moveable unit, and the optical pickup is provided with a spring cantilever that is brought up against the free end of the spring piece and caused to change the shape of the spring piece from a cantilevered shape to a double-end supported beam shape when the stop is received by the catch, and the spring piece is flexurally deformed.

For example, there is disclosed in Japanese Laid-open Patent Publication No. 2008-257826 a configuration of a feeding apparatus for an optical pickup comprising a lead screw and a resin toothed body that is advanced following the rotation of the lead screw while being in meshed engagement with the lead screw, the toothed body being attached to an optical pickup that can move along a guide axis adjusted at a slant, extended in a cantilevered state in a direction orthogonal to the axis line of the lead screw, and provided with a spring body for elastically urging the toothed body from a back part and urging meshing cogs thereof in a direction of meshing with the lead screw; wherein the position of urging the toothed body by the spring body in relation to the position of meshing between the meshing cogs of the toothed body and the lead screw is offset toward the free end of the toothed body and away from the meshing position.

Drive devices must be made thinner in order to respond to the recent demand for smaller optical disc apparatuses. Reducing the thickness of the traverse chassis on which the optical pickup is mounted is considered as a possible solution, but simply reducing the thickness results in insufficient strength. The size of the opening in the bottom surface of the traverse chassis must thus be reduced to enhance the strength.

Another feature is that the lead screw and the stepper motor are attached from the upper surface of the traverse chassis as the drive device is made progressively thinner. Accordingly, the shape of the section containing the meshing cogs of the tooth is also turned upside-down, and the section containing the meshing cogs must be fitted from the upper surface of the lead screw.

In the assembly operation, the tooth is attached from the bottom surface of the traverse chassis in a state in which the optical pickup is mounted. Time is required in this case for the fingers holding the tooth to come up against the traverse chassis and to attach the tooth to the chassis when the section containing the meshing cogs is run through to the lead screw and fitted to the lead screw from the section with a small opening in the bottom surface of the traverse chassis. Attaching the tooth is thus difficult to achieve in the assembly operation, causing problems in terms of reduced production efficiency.

SUMMARY OF THE INVENTION

An object of the present invention is to provide a thin drive device for an optical disc apparatus by making tooth attachment easier without reducing production efficiency.

In order to achieve the aforementioned object, the present invention provides a drive device for an optical disc apparatus comprising an optical pickup; a guide shaft for movably supporting the optical pickup; a lead screw; a resin tooth fixed to the optical pickup, the tooth extending toward the lead screw in a cantilevered state, meshing cogs thereof being in meshed engagement with the lead screw, and the tooth being advanced following the rotation of the lead screw; and a traverse chassis for mounting the aforementioned members; wherein the tooth comprises a tooth body fixed to the optical pickup; support pieces projecting from the tooth body toward the lead screw; resin spring pieces having a base part on the projecting ends of the support pieces and extending in a direction orthogonal to the axial direction of the lead screw; a plate part provided with a base part on the extending ends of the resin spring pieces and formed in a direction parallel to the axial direction of the lead screw; meshing cogs formed on the plate part on the side near the lead screw; a cover projecting above the lead screw from the plate part disposed above the meshing cogs, straddling the lead screw, and bending sharply downward at a distal end; and a handle projecting from the tooth body.

In the drive device of an optical disc apparatus, the handle is preferably arranged so as to be positioned in an opening in the traverse chassis when the tooth is attached.

In the drive device of an optical disc apparatus, the tooth is preferably attached to the bottom surface of the optical pickup from the bottom surface of the traverse chassis.

According to the present invention, tooth attachment is made easier by providing a handle to the tooth, making it possible to implement a thin drive device for an optical disc apparatus without reducing production efficiency.

BRIEF DESCRIPTION OF THE DRAWINGS

FIG. 5A is a plan view of a tooth according to the present invention;

FIG. 6A is a plan view of a tooth according to a comparative example;

DETAILED DESCRIPTION OF PREFERRED EMBODIMENTS

Figure 1A:
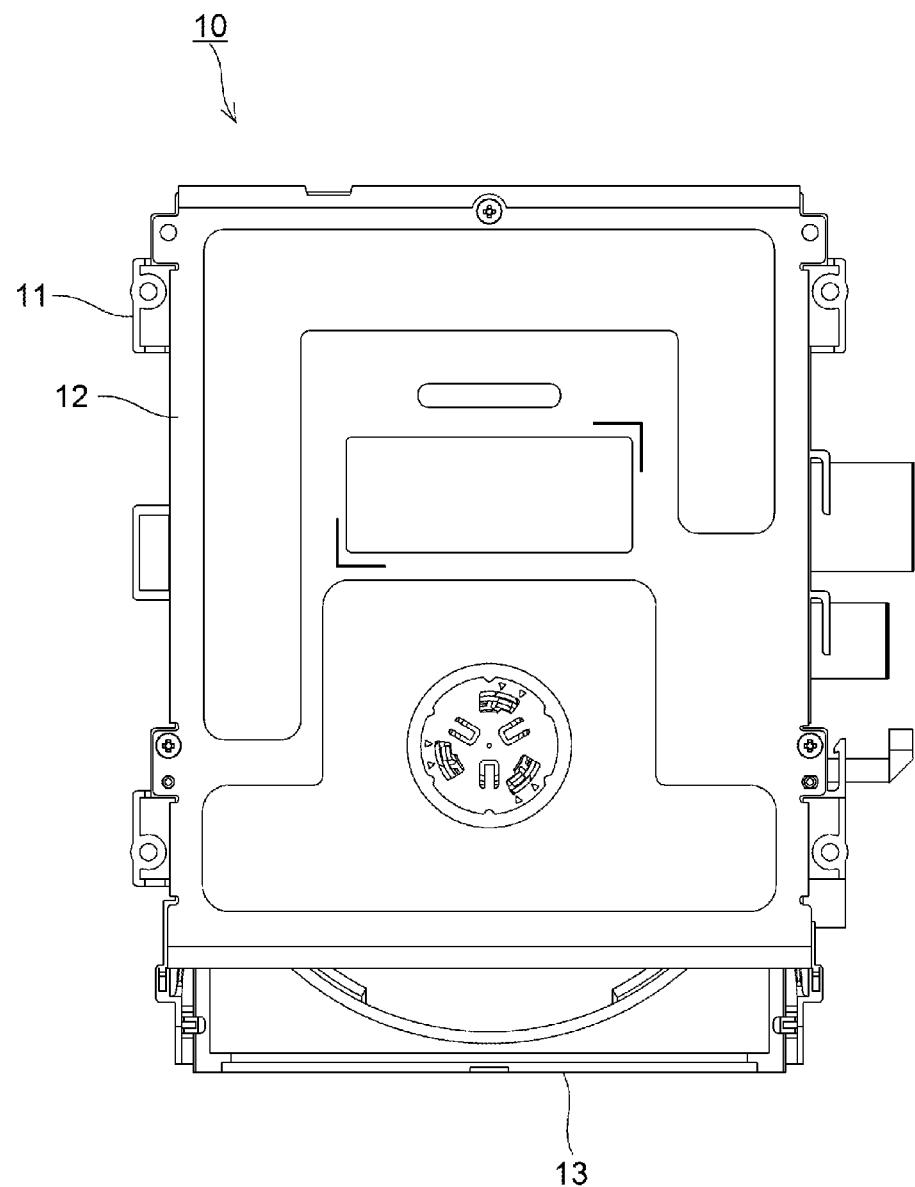
FIG. 1A is a plan view of a drive device for an optical disc apparatus according to the present invention.
Figure 1B:
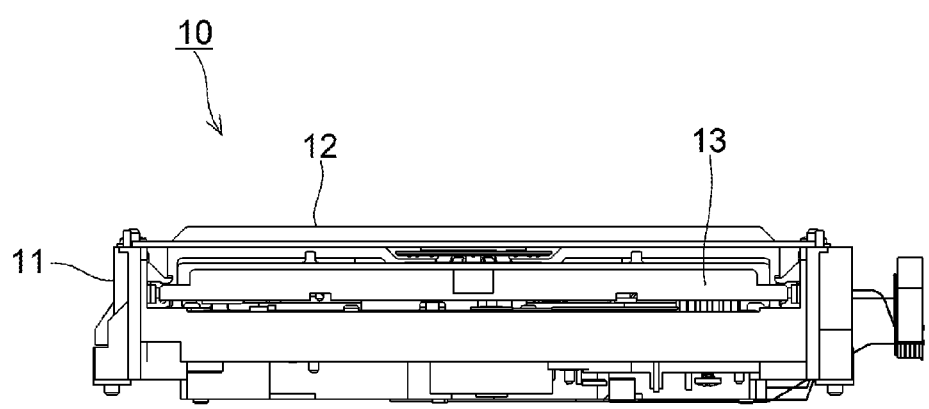
FIG. 1B is a front view of the drive device for an optical disc apparatus according to the present invention.
Figure 1C:
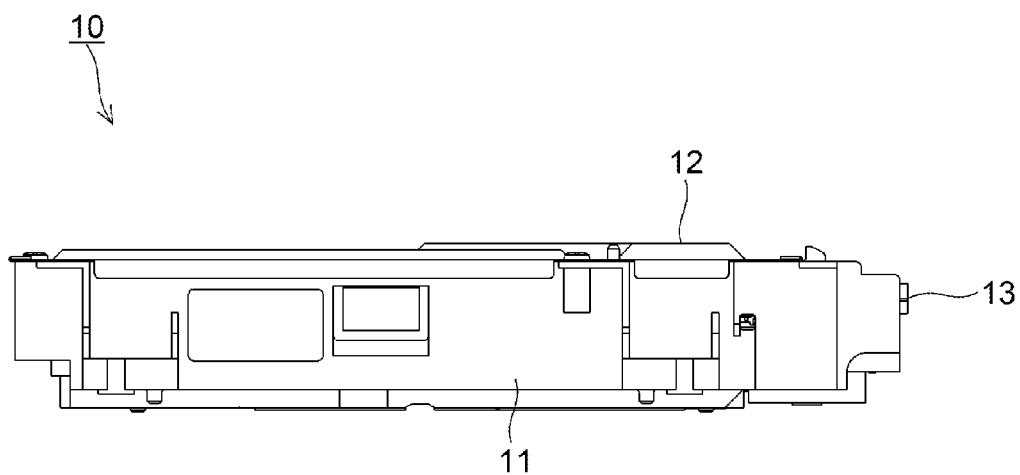
FIG. 1C is a left-side view of the drive device for an optical disc apparatus according to the present invention.
Figure 1D:
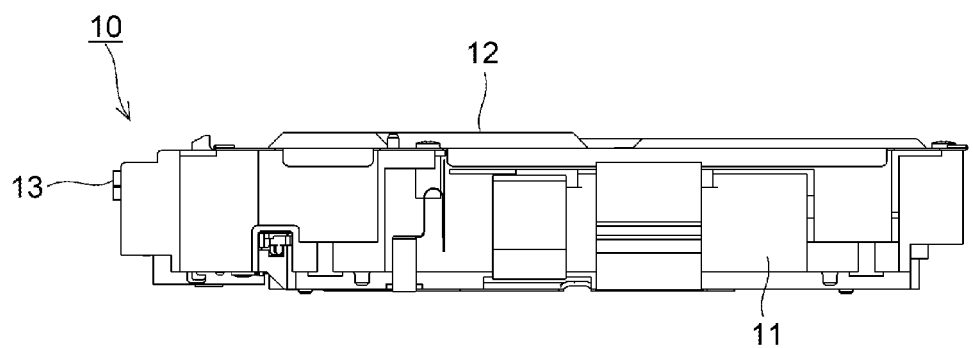
FIG. 1D is a right-side view of the drive device for an optical disc apparatus according to the present invention.
Figure 1E:
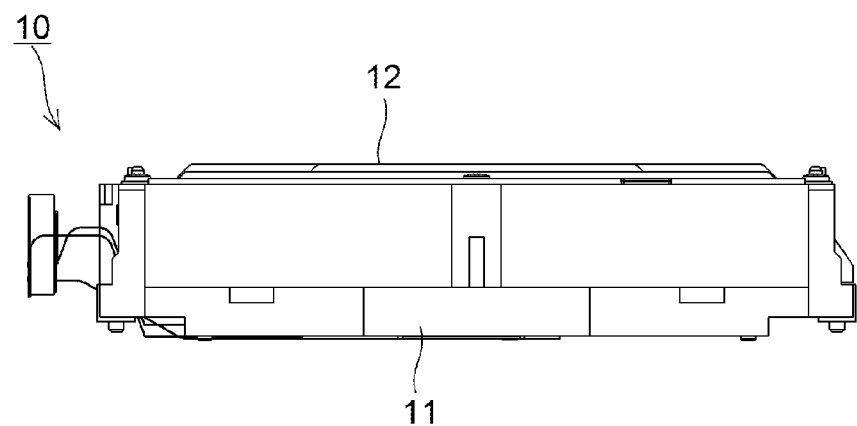
FIG. 1E is a back view of the drive device for an optical disc apparatus according to the present invention.
Figure 1F:
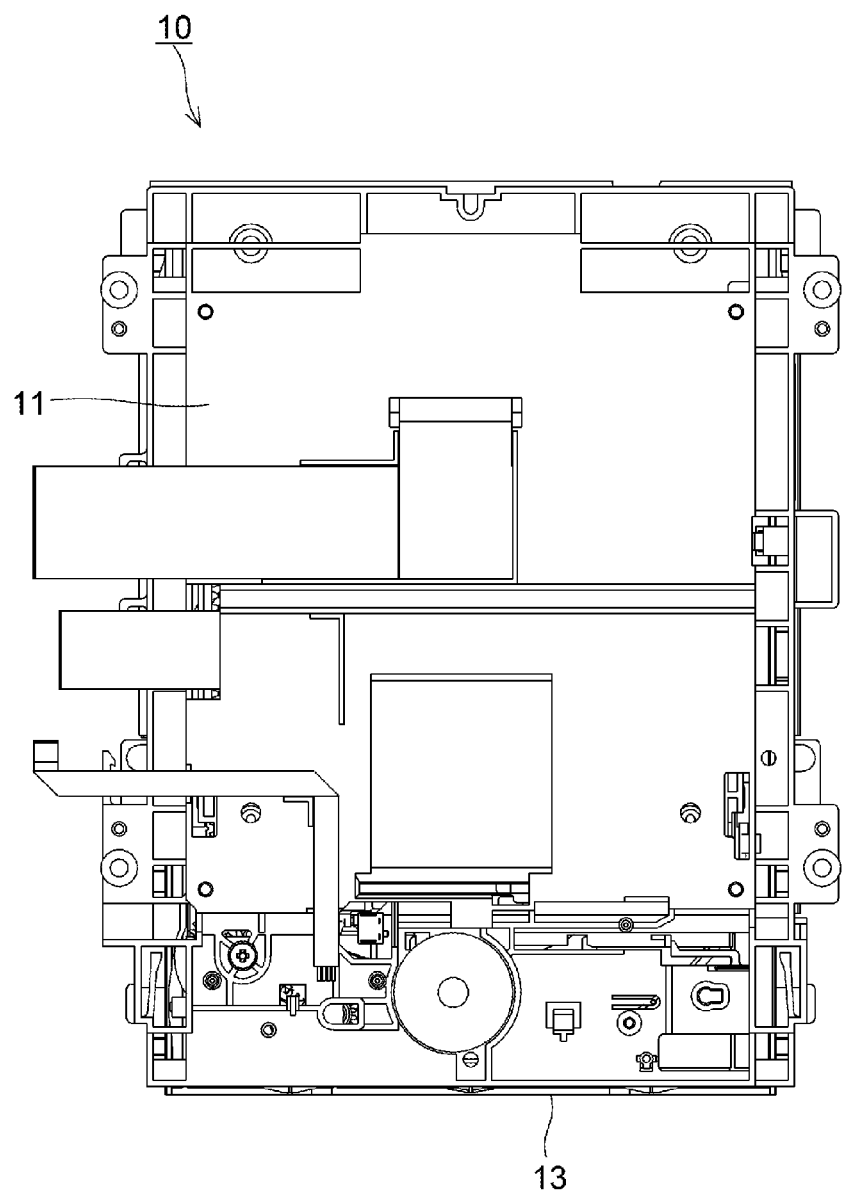
FIG. 1F is a bottom view of the drive device for an optical disc apparatus according to the present invention.
Figure 2A:
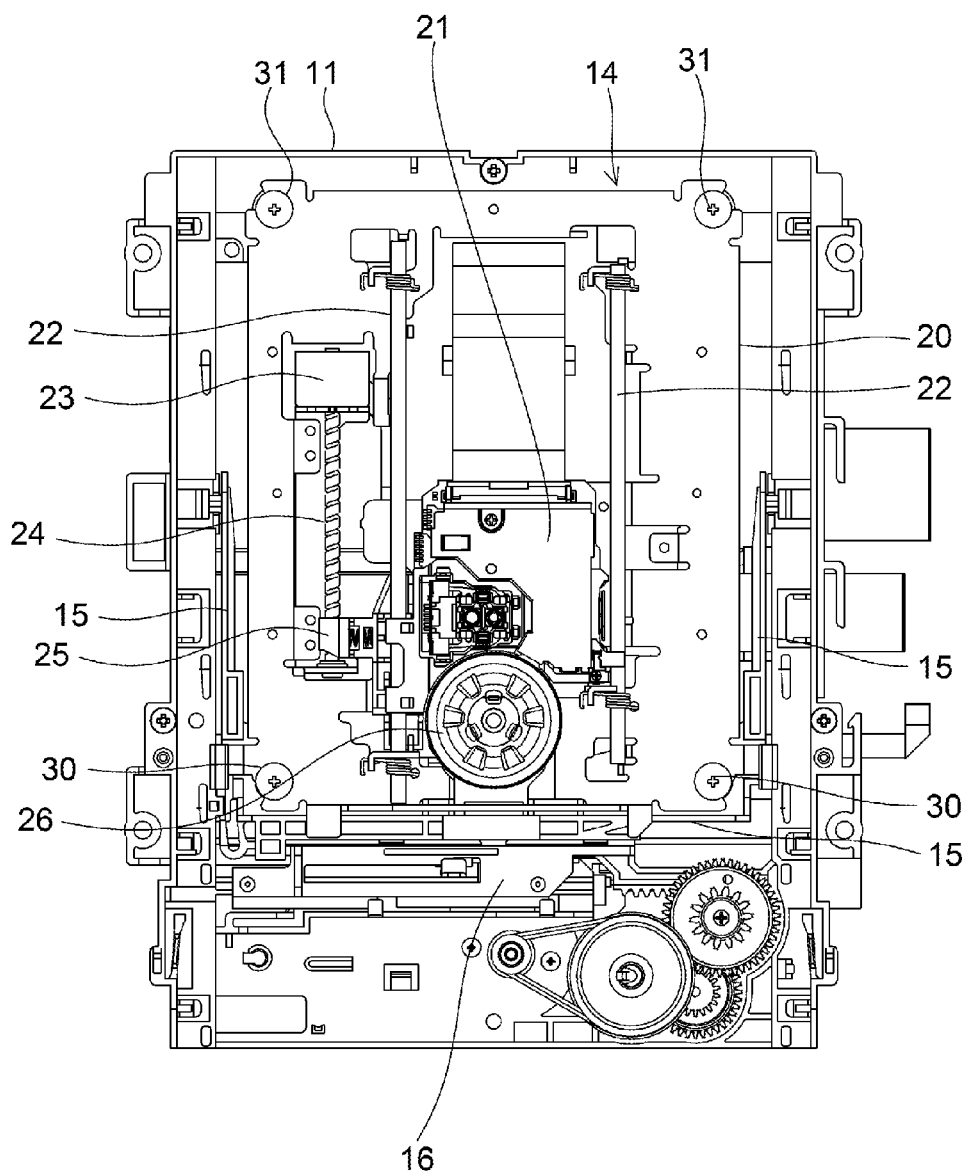
FIG. 2A is a view of FIG. 1A, with the cover and disc tray removed.
Figure 2B:
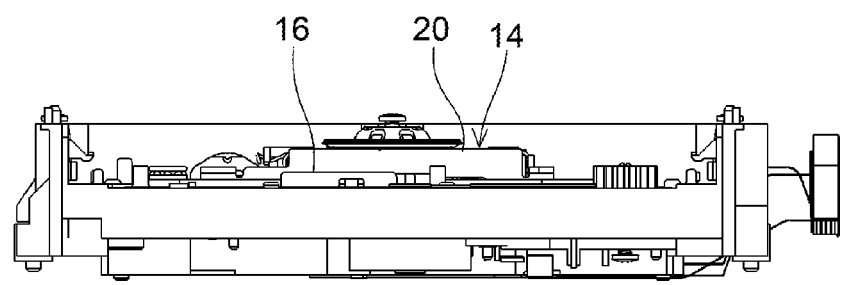
FIG. 2B is a view of FIG. 1B, with the cover and disc tray removed.
Figure 2C:
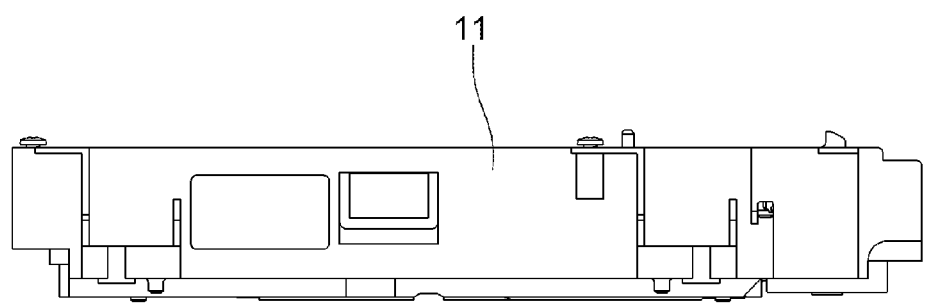
FIG. 2C is a view of FIG. 1C, with the cover and disc tray removed.
Figure 2D:
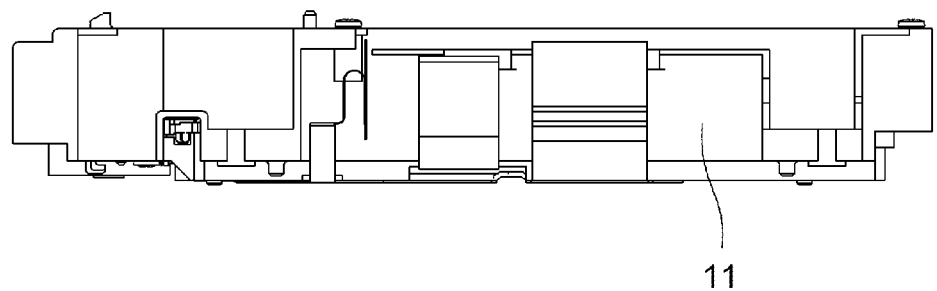
FIG. 2D is a view of FIG. 1D, with the cover and disc tray removed.
Figure 2E:
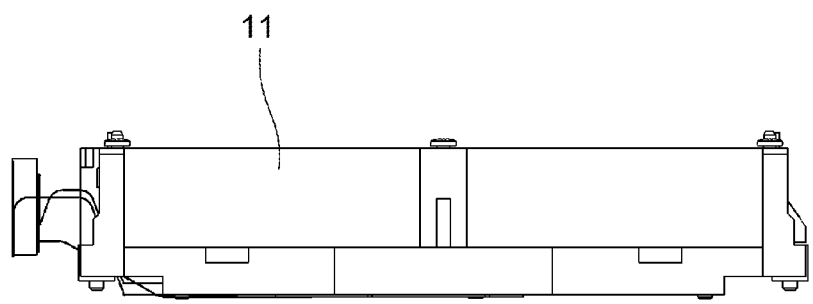
FIG. 2E is a view of FIG. 1E, with the cover and disc tray removed.
Figure 2F:
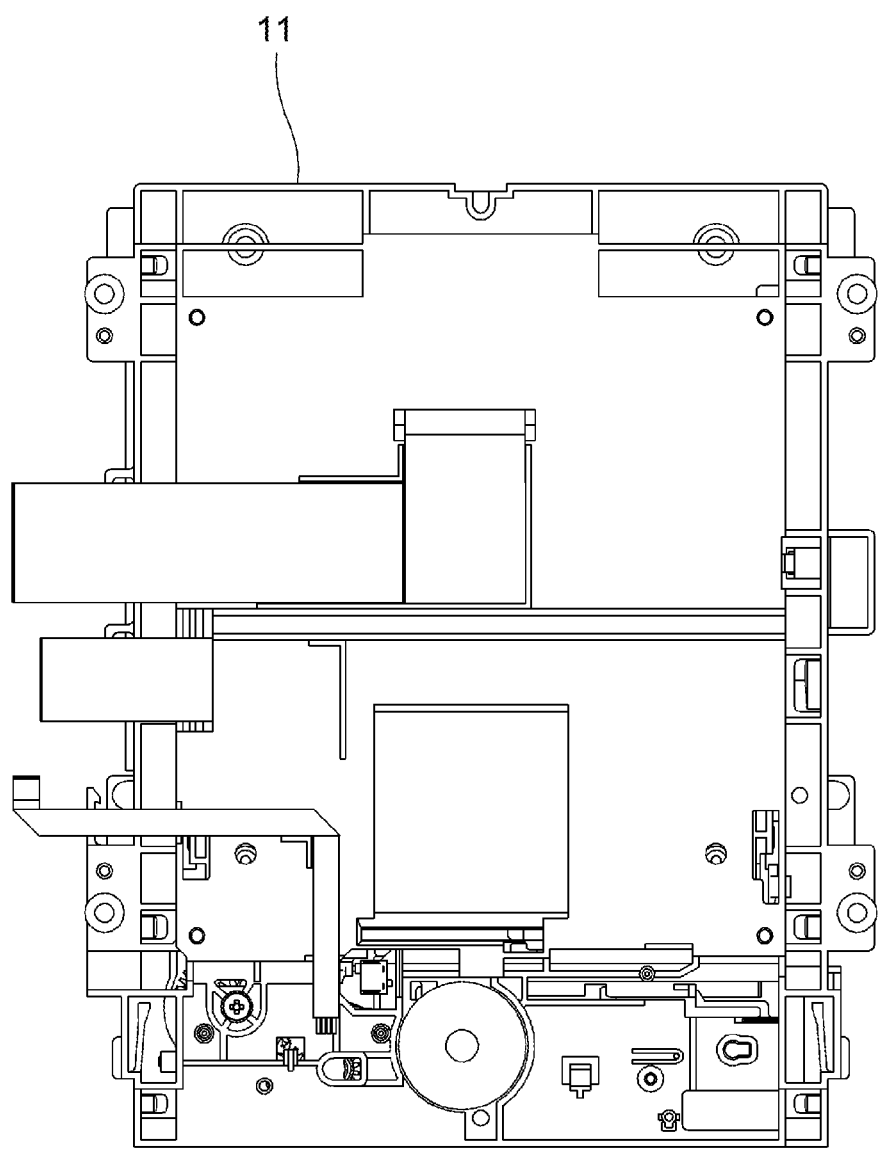
FIG. 2F is a view of FIG. 1F, with the cover and disc tray removed.
Figure 3A:
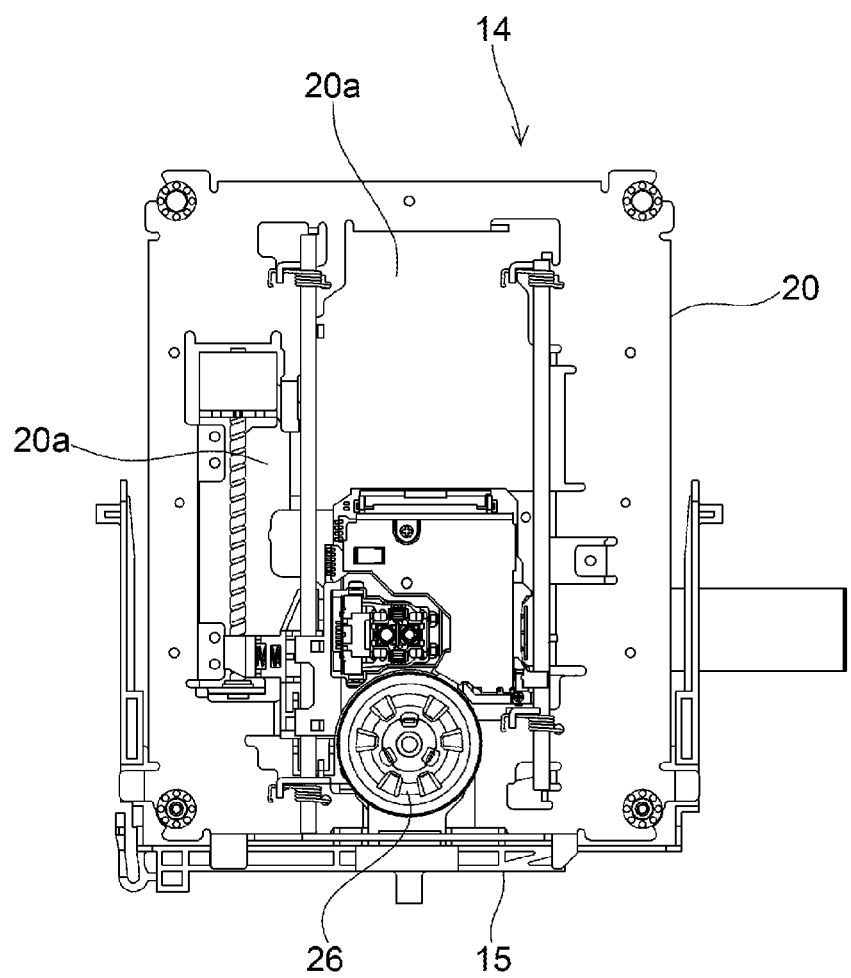
FIG. 3A is a plan view of the traverse assembly and the lever arm according to the present invention.
Figure 3B:
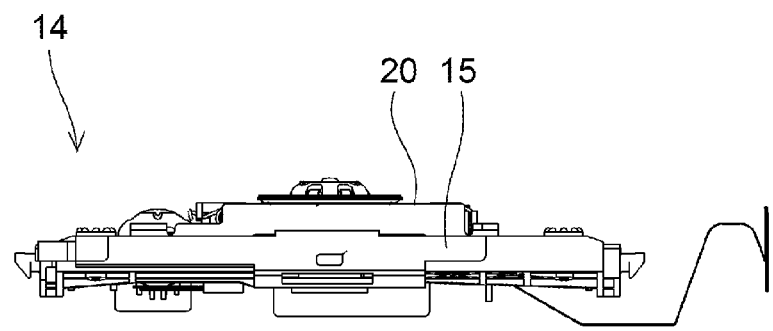
FIG. 3B is a front view of the traverse assembly and the lever arm according to the present invention.
Figure 3C:
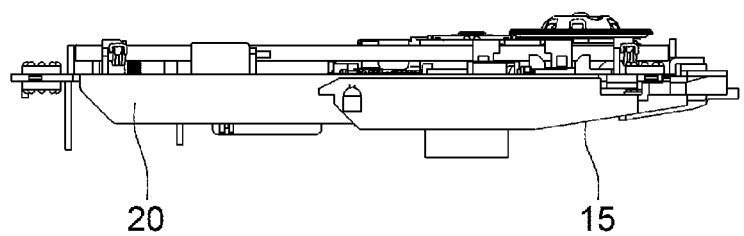
FIG. 3C is a left-side view of the traverse assembly and the lever arm according to the present invention.
Figure 3D:
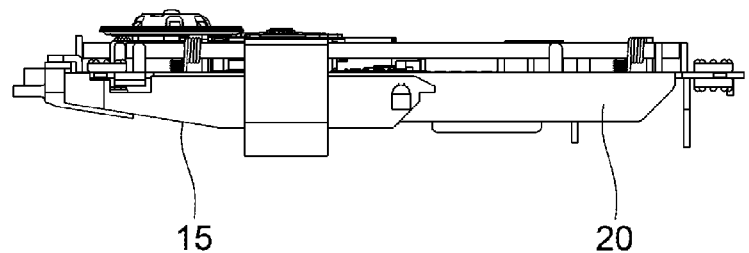
FIG. 3D is a right-side view of the traverse assembly and the lever arm according to the present invention.
Figure 3E:
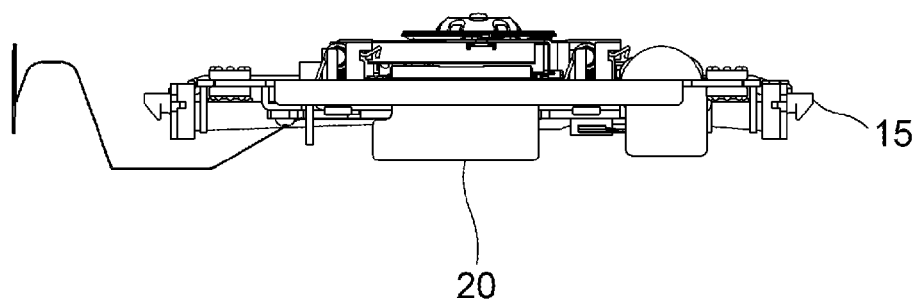
FIG. 3E is a back view of the traverse assembly and the lever arm according to the present invention.
Figure 3F:
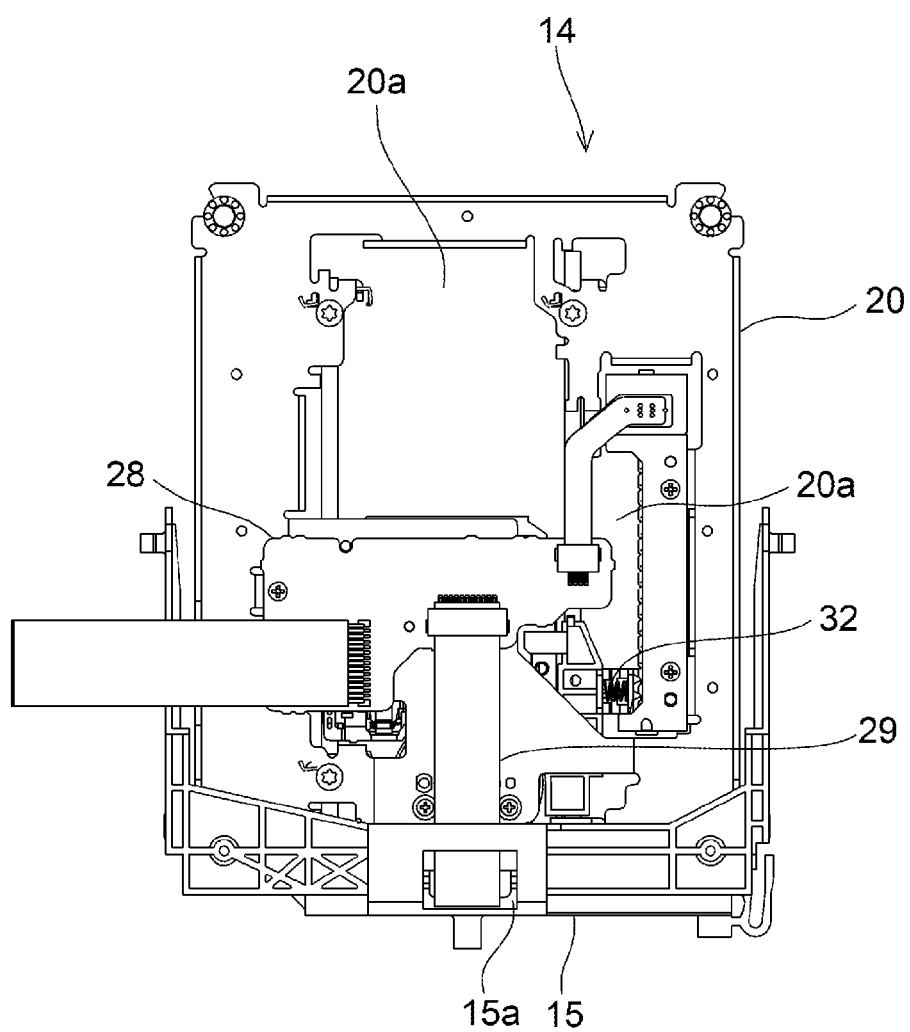
FIG. 3F is a bottom view of the traverse assembly and the lever arm according to the present invention.
Figure 4A:
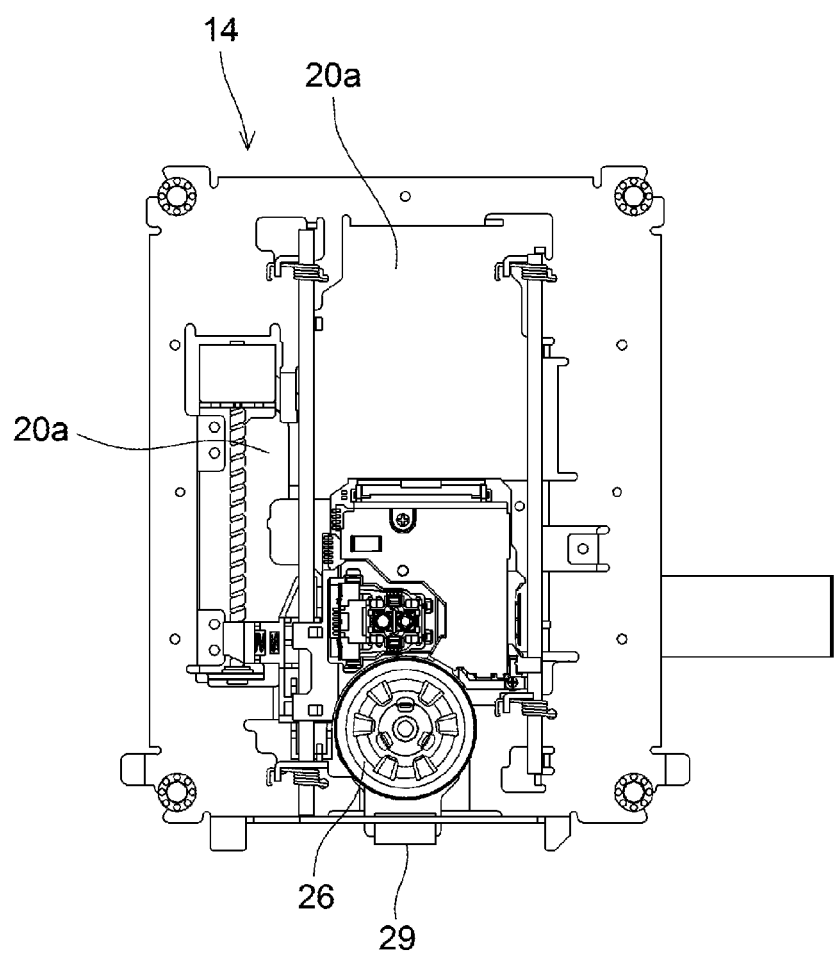
FIG. 4A is a plan view of the traverse assembly according to the present invention.
Figure 4B:
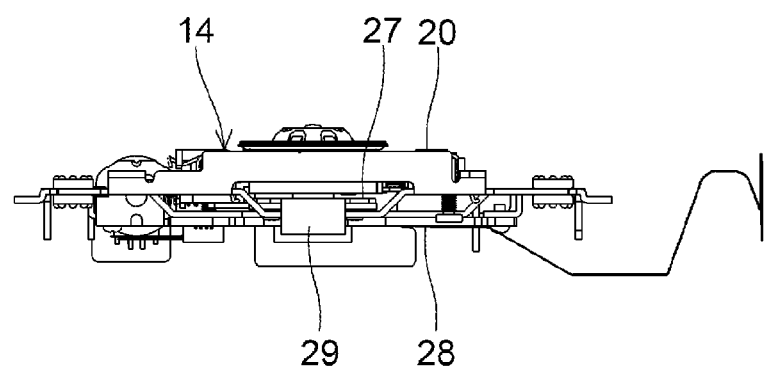
FIG. 4B is a front view of the traverse assembly according to the present invention.
Figure 4C:
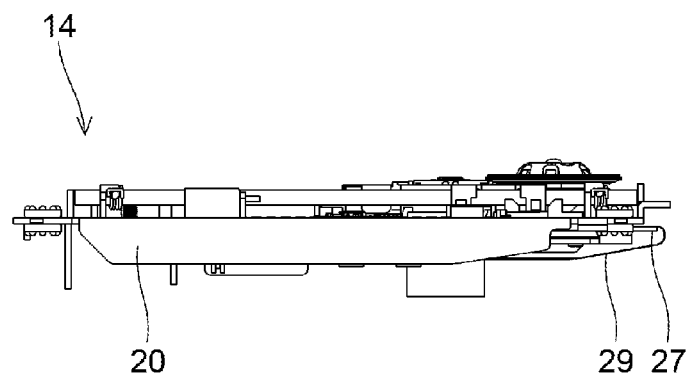
FIG. 4C is a left-side view of the traverse assembly according to the present invention.
Figure 4D:
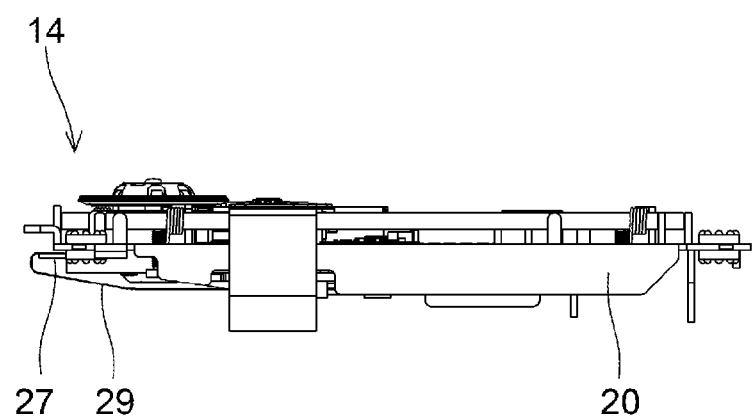
FIG. 4D is a right-side view of the traverse assembly according to the present invention.
Figure 4E:
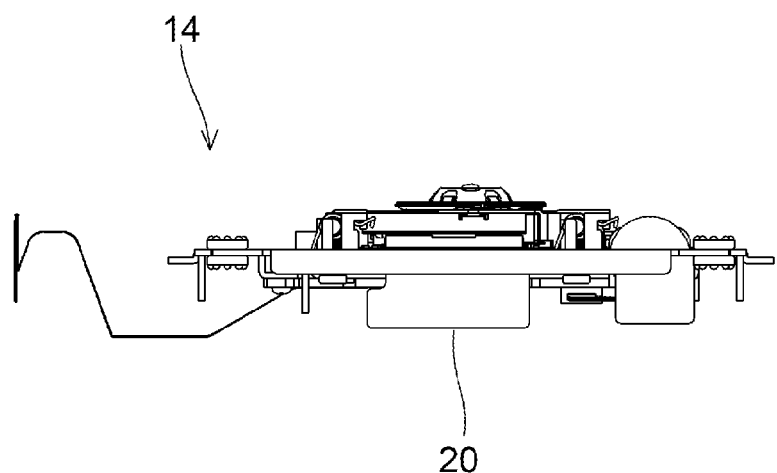
FIG. 4E is a back view of the traverse assembly according to the present invention.
Figure 4F:
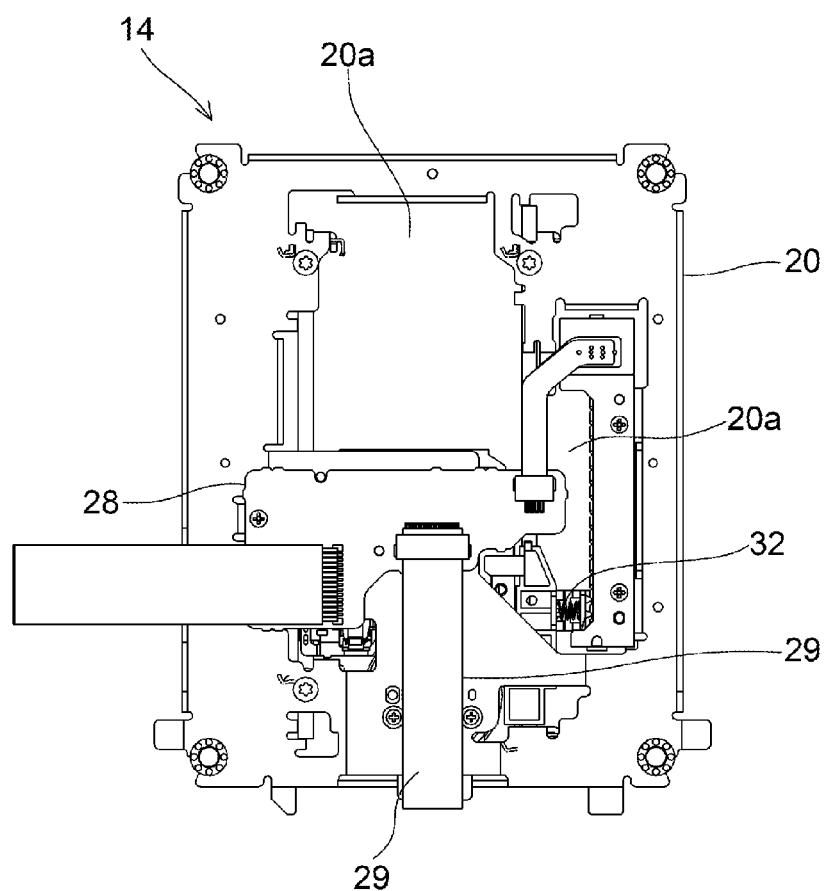
FIG. 4F is a bottom view of the traverse assembly according to the present invention.

FIGS. 1A to 1F are six views of a drive device for an optical disc apparatus according to the present invention, where FIG. 1A is a plan view, FIG. 1B is a front view, FIG. 1C is a left-side view, FIG. 1D is a right-side view, FIG. 1E is a back view, and FIG. 1F is a bottom view. FIGS. 2A to 2F are views of FIGS. 1A to 1F, respectively, with the upper cover and disc tray removed. In addition, FIGS. 3A to 3F are six views of the traverse assembly 14 and the lever arm 15, where FIG. 3A is a plan view, FIG. 3B is a front view, FIG. 3C is a left-side view, FIG. 3D is a right-side view, FIG. 3E is a back view, and FIG. 3F is a bottom view. FIGS. 4A to 4F are six views of the traverse assembly 14, where FIG. 4A is a plan view, FIG. 4B is a front view, FIG. 4C is a left-side view, FIG. 4D is a right-side view, FIG. 4E is a back view, and FIG. 4F is a bottom view.

A drive device 10 is accommodated in the housing of an apparatus body that forms the exterior of an optical disc apparatus. The drive device 10 comprises a loader chassis 11 for accommodating the members of the drive device 10, a cover 12 for covering the upper-surface opening of the loader chassis 11, a disc tray 13 for conveying an optical disc, a traverse assembly 14 capable of rotating and moving up and down in a direction substantially perpendicular (vertical direction) to the conveying direction (forward/backward direction) of the disc tray 13, a vertically moving lever arm 15 having a substantially U-shape in plan view and covering part (near the front end of the lower surface in the present embodiment) of the lower surface of the traverse assembly 14 as well as supporting the traverse assembly 14, a cam slider 16 for engaging as a cam with the front part of the lever arm 15 and moving in a left-right direction (direction substantially orthogonal to the conveying direction of the disc tray 13 and the up/downwardly moving direction of the traverse assembly 14) to vertically move the lever arm 15, and a motor (not shown) for driving the disc tray 13 and the cam slider 16 via a plurality of gears.

The traverse assembly 14 comprises a traverse chassis 20 for mounting the members; an optical pickup unit (OPU) 21; two guide shafts 22, 22 for supporting the OPU 21 while allowing movement in the radial direction (forward/backward direction) of the optical disc; a stepper motor 23 for driving the OPU 21; a lead screw 24 connected to the stepper motor 23; a resin tooth 25 fixed to the OPU 21, the tooth extending toward the lead screw 24 in a cantilevered state, the meshing cogs thereof being in meshed engagement with the lead screw 24, and the tooth being advanced following the rotation of the lead screw 24; a tooth spring 32 for urging the meshing cogs in the direction of meshing with the lead screw 24 (refer to FIG. 3F); a spindle motor 26 provided to the section near the front of the upper surface of the traverse chassis 20 and used for rotating the optical disc; a spindle motor PCB (printed board) 27 on which the spindle motor 26 is mounted (refer to FIG. 4B); a PCB 28 provided to the lower surface of the traverse chassis 20 and used for controlling the entire drive device 10 (refer to FIG. 4F); and a spindle motor FFC (flexible flat cable) 29 connected by one end to the spindle motor PCB 27, extended from the front of the traverse chassis 20 around the underside of the traverse chassis 20, passed between the traverse chassis 20 and the lever arm 15, and connected by the other end to the PCB 28 (refer to FIG. 4A).

Openings 20a are formed in sections of the traverse chassis 20 that face each other when the OPU 21 and the tooth 25 are positioned on the back end of the traverse chassis 20, and the tooth 25 and the like can be attached from these openings. The traverse assembly 14 is locked to the lever arm 15 by locking parts 30, 30 at two points on the front end of the traverse chassis 20, and is locked to the loader chassis 11 by locking parts 31, 31 at two points on the back end of the traverse chassis 20. The locking parts 30, 31 are rubber O-rings and screws.

In the optical disc apparatus configured as described above, the disc tray 13 is conveyed in the disc device 10 by the driving of the motor when an optical disc is placed on the disc tray 13 in a pulled-out state. When the disc tray 13 is disposed at a specified position, transmission of the driving power of the motor to the disc tray 13 is canceled to stop the disc tray 13, the cam slider 16 is moved by the driving of the motor, and the traverse assembly 14 is raised. The traverse assembly 14 is thereby engaged with the optical disc, and the optical disc is chucked.

Transmission of the driving power of the motor to the cam slider 16 is cancelled and the cam slider 16 and the traverse assembly 14 are stopped when the optical disc is chucked. The OPU 21 is then moved to a specified position by the driving of the stepper motor 23, and the optical disc is recorded on or played. In addition, an operation opposite to that described above is performed when the optical disc is removed.

Figure 5B:
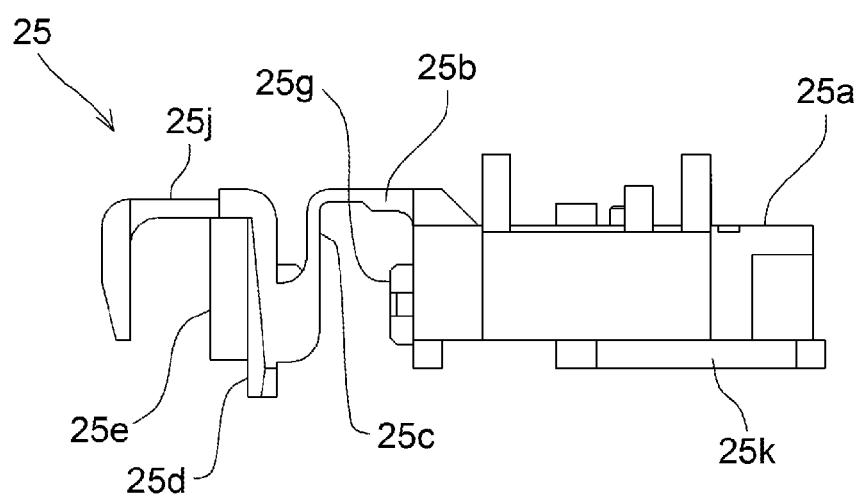
FIG. 5B is a front view of a tooth according to the present invention.
Figure 5C:
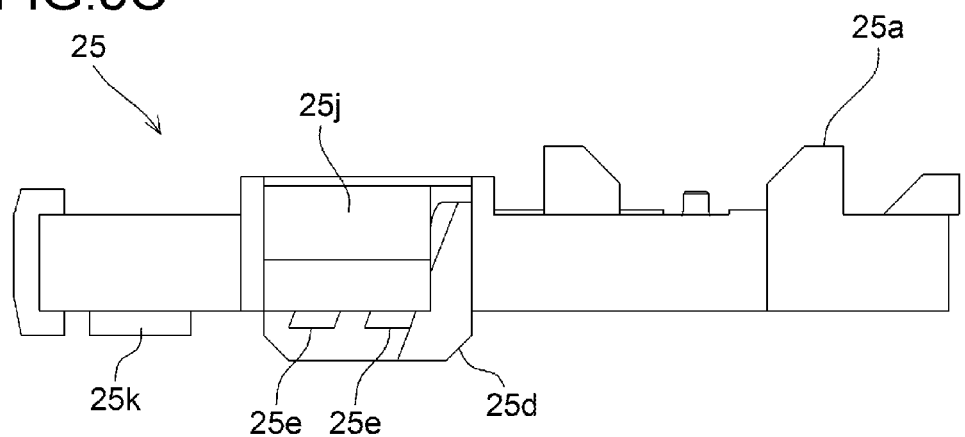
FIG. 5C is a left-side view of a tooth according to the present invention.
Figure 5D:
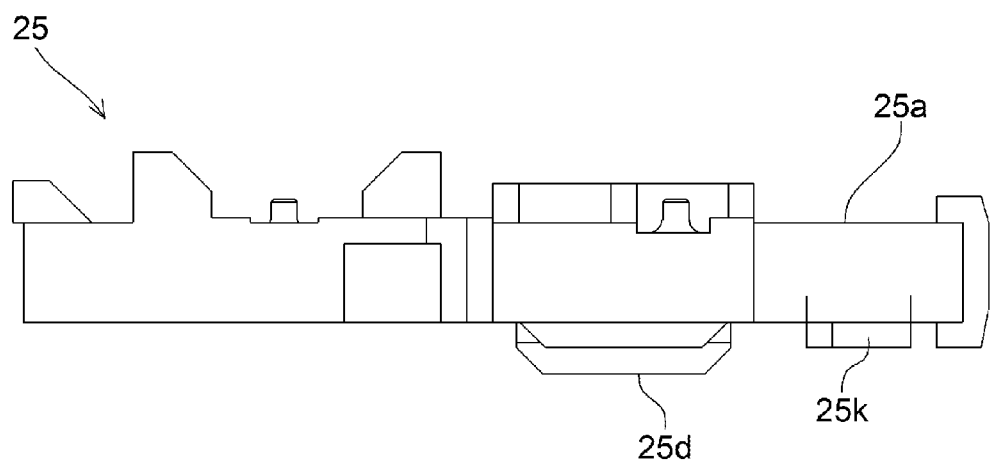
FIG. 5D is a right-side view of a tooth according to the present invention.
Figure 5E:
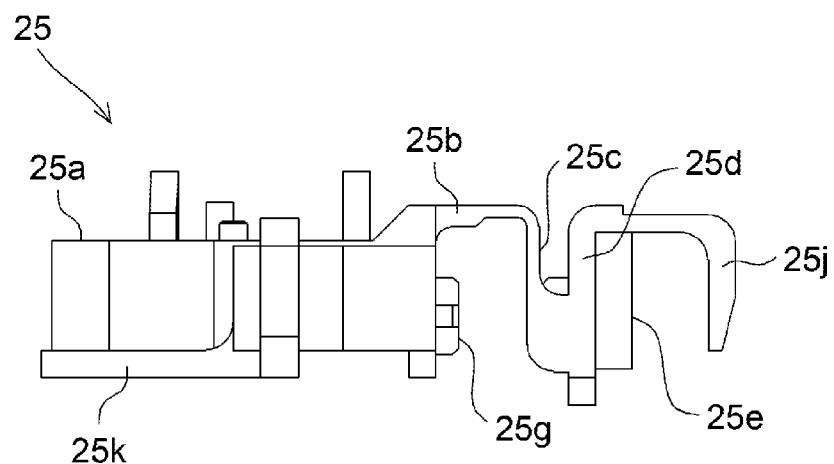
FIG. 5E is a back view of a tooth according to the present invention.
Figure 5F:
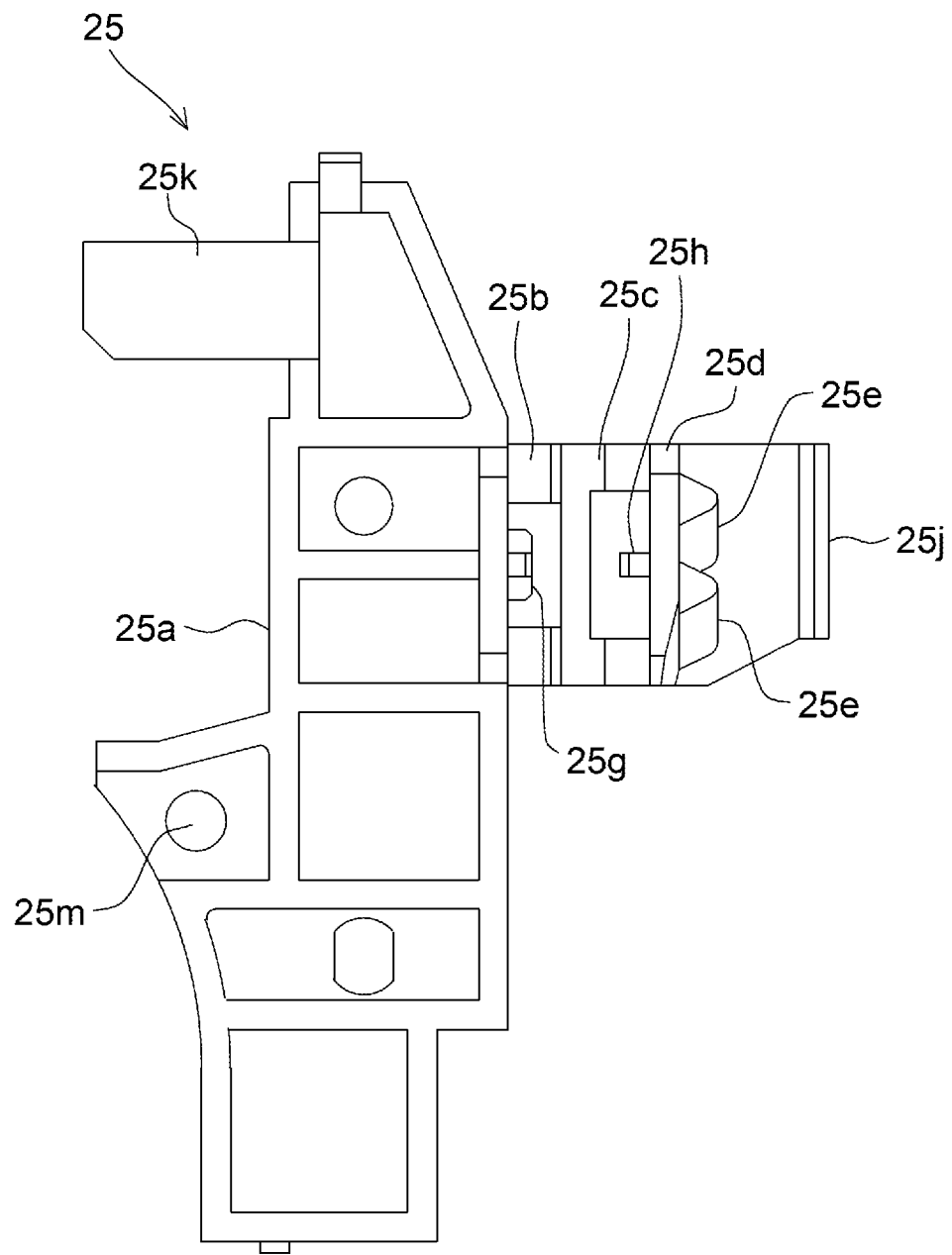
FIG. 5F is a bottom view of a tooth according to the present invention.

The structure of the tooth 25 will now be described in detail. FIGS. 5A to 5F are six views of the tooth 25, where FIG. 5A is a plan view, FIG. 5B is a front view, FIG. 5C is a left-side view, FIG. 5D is a right-side view, FIG. 5E is a back view, and FIG. 5F is a bottom view.

The tooth 25 comprises a tooth body 25a formed of POM (polyoxymethylene) or the like by injection molding or the like and fixed to the lower surface of the OPU 21 by a screw or the like; a plurality (two in this embodiment) of support pieces 25b, 25b projecting from the tooth body 25a toward the lead screw 24; a plurality (two in this embodiment) of resin spring pieces 25c, 25c having a base part on the projecting end of each of the support pieces 25b, 25b and extending in a direction orthogonal to the axial direction of the lead screw 24; a plate part 25d provided with a base part on the extending ends of the resin spring pieces 25c, 25c and formed in a direction parallel to the axial direction of the lead screw 24; ribbed meshing cogs 25e, 25e formed on the plate part 25d on the side near the lead screw 24; a cover 25j projecting horizontally above the lead screw 24 from an end part of the plate part 25d disposed above the meshing cogs 25e, 25e, the cover 25j extending so as to straddle the lead screw 24, bend sharply downward at the distal end, and cover an area all the way to the side near the lead screw 24; and a handle 25k projecting from the tooth body 25a.

In the present embodiment, the resin spring pieces 25c are formed thinner than the support pieces 25b. In addition, the width of the resin spring pieces 25c, 25c in plan view is less than the width of the support pieces 25b, 25b in plan view.

The handle 25k is a tabular member projecting from the right-side surface of the back end part of the tooth body 25a, and is large enough to be grasped by two fingers (for example, the thumb and forefinger) of a hand. The shape of the handle 25k is not particularly limited, and may be bent in alignment with the shape of the opening 20a in the traverse chassis 20, or may be, for example, an L-shape or the like. The position at which the handle 25k is formed should be a position at which the handle can be grasped and attached by the fingers, and the position is established in this embodiment so that the handle 25k is positioned in the opening 20a of the traverse chassis 20 when the tooth 25 is attached.

In the assembly operation, the tooth 25 is attached from the bottom surface of the traverse chassis 20 in a state in which the OPU 21 is mounted. At this time, the PCB 28 and the FFCs (refer to FIGS. 3F and 4F) connected to the PCB are not yet attached to the traverse chassis 20, and a state is established in which the entire opening 20a can be seen from the bottom surface of the traverse chassis 20. In an operation in which the handle 25k of the tooth 25 is grasped by the fingers, and which is performed from the bottom surface of the traverse chassis 20, the cover 25j of the traverse chassis 20 is run through to the lead screw 24 that faces the opening 20a, and is fitted to the lead screw 24; a screw hole 25m in the tooth body 25a is superposed on a screw hole in the bottom surface of the OPU 21; and the components are fixed by a screw prepared in advance.

In this sequence of operations to assemble the tooth 25, the presence of the opening 20a on an extension of the handle 25k makes it possible to facilitate attachment without the fingers grasping the handle 25k coming up against the traverse chassis 20. Accordingly, the tooth 25 can be attached to the OPU 21 using at least the same amount of operation time as in conventional practice, and production efficiency is therefore not reduced.

The tooth spring 32 is a coil-shaped compression spring disposed in a space between the resin spring pieces 25c so as to urge the tooth body 25a and the plate part 25d. Specifically, protrusions 25g, 25h are formed facing each other in sections facing the tooth body 25a and the plate part 25d, respectively, and both ends of the tooth spring 32 are fitted to the protrusions 25g, 25h, whereby the tooth spring 32 is supported so as not to fall out.

When the stepper motor 23 is driven in such a configuration, the lead screw 24 is rotated, the driving power is transmitted to the meshing cogs 25e, 25e of the tooth 25, and the tooth 25 and the OPU 21 fixed thereupon are advanced along the guide shafts 22, 22.

Figure 6B:
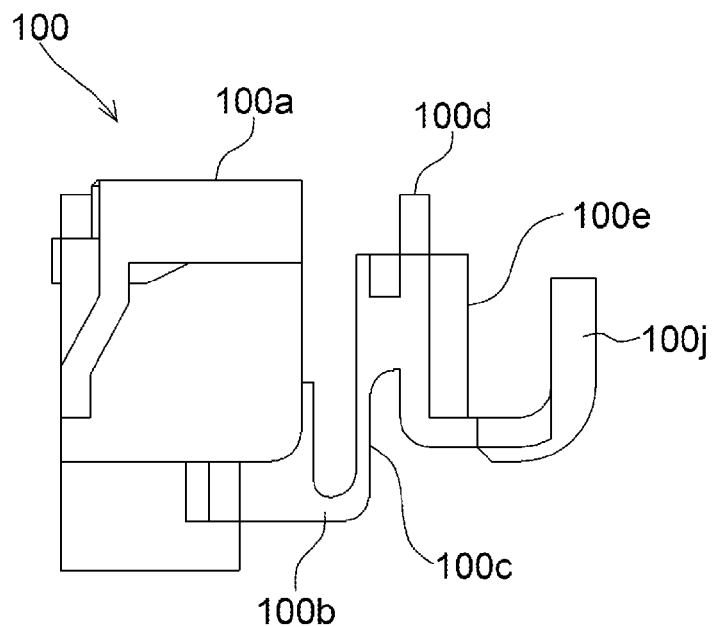
FIG. 6B is a front view of a tooth according to a comparative example.
Figure 6C:
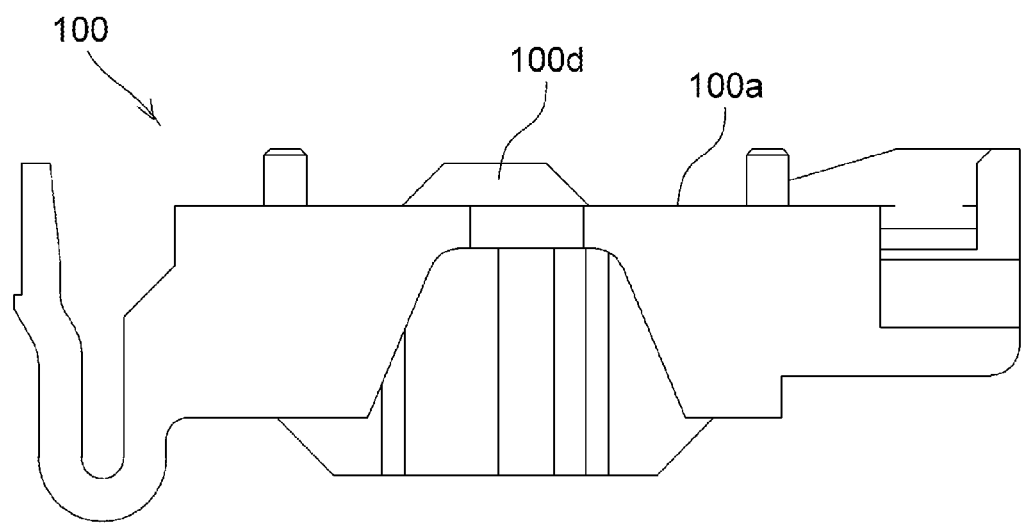
FIG. 6C is a left-side view of a tooth according to a comparative example.
Figure 6D:
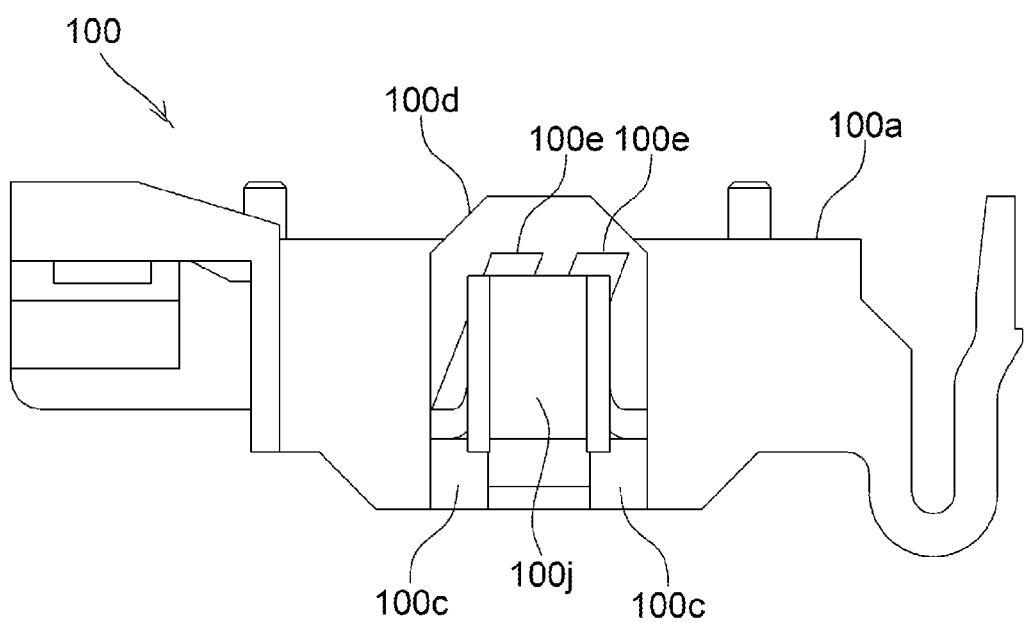
FIG. 6D is a right-side view of a tooth according to a comparative example.
Figure 6E:
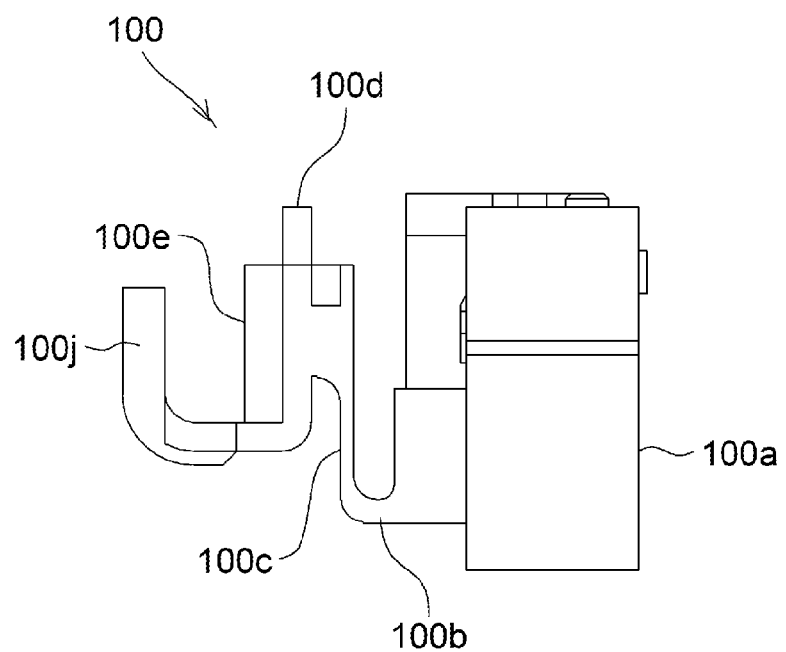
FIG. 6E is a back view of a tooth according to a comparative example.
Figure 6F:
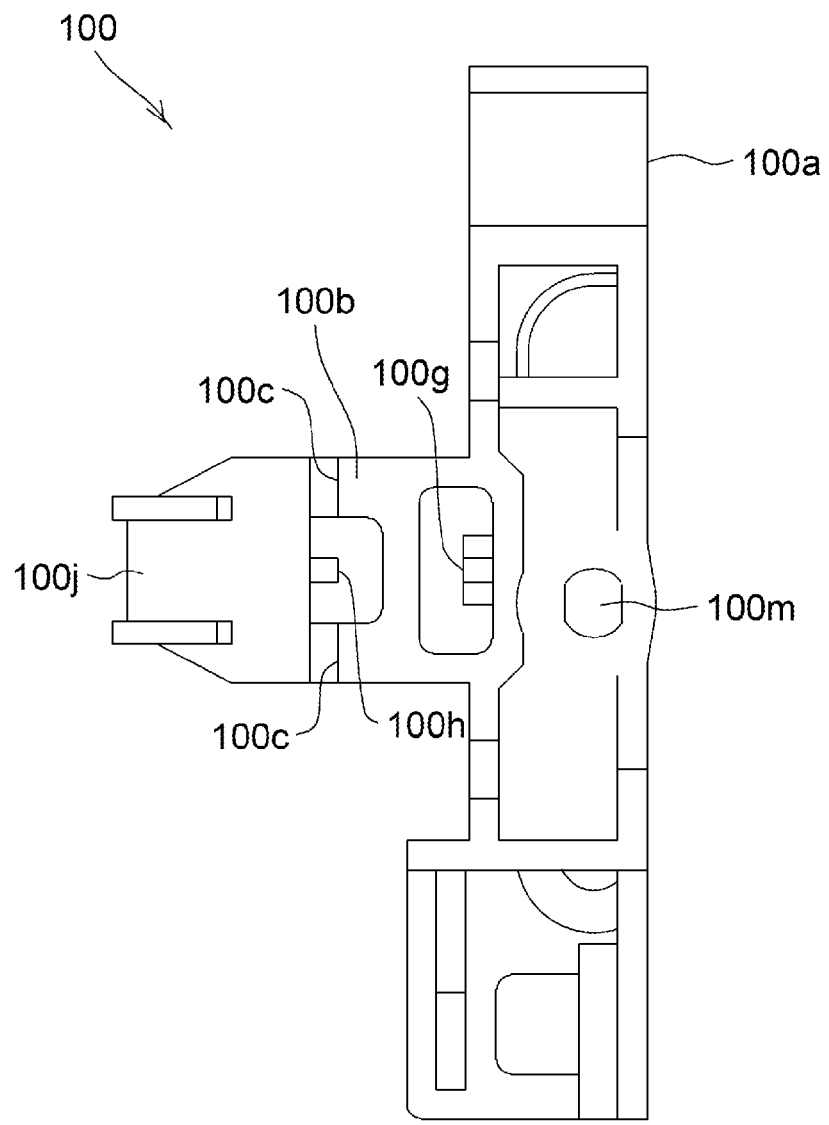
FIG. 6F is a bottom view of a tooth according to a comparative example.

A tooth that is not designed to be made thinner will now be described as a comparative example. FIGS. 6A to 6F are six views of the tooth according to the comparative example, where FIG. 6A is a plan view, FIG. 6B is a front view, FIG. 6C is a left-side view, FIG. 6D is a right-side view, FIG. 6E is a back view, and FIG. 6F is a bottom view.

The tooth 100 comprises a tooth body 100a fixed to the lower surface of an OPU by a screw or the like; two support pieces 100b, 100b projecting from the tooth body 100a toward a lead screw; two resin spring pieces 100c, 100c having a base part on the projecting end of each of the support pieces 100b, 100b and extending in a direction orthogonal to the axial direction of the lead screw; a plate part 100d provided with a base part on the extending ends of the resin spring pieces 100c, 100c and formed in a direction parallel to the axial direction of the lead screw; meshing cogs 100e, 100e formed on the plate part 100d on the side near the lead screw; a cover 100j projecting horizontally below the lead screw from an end part of the plate part 100d disposed below the meshing cogs 100e, 100e, the cover 100j extending so as to straddle the lead screw, bend sharply upward at the distal end, and cover an area all the way to the side near the lead screw; and protrusions 100g, 100h to which both ends of a tooth spring are fitted.

A comparison between the tooth 25 of the present invention and the tooth 100 of the comparative example shows that the tooth 25 of the present invention is markedly thinner than the tooth 100 of the comparative example.

In the operation to assemble the tooth 100 according to the comparative example, the tooth 100 is attached from the bottom surface of the traverse chassis in a state in which the OPU is mounted. In an operation in which the tooth body 100*a* is grasped by fingers so that both longitudinal ends of the tooth body 100*a* are held between the fingers, and which is performed from the bottom surface of the traverse chassis, the lead screw is covered from above by the cover 100*j* of the traverse chassis, the meshing cogs are brought into meshed engagement with the lead screw, a screw hole 100*m* of the tooth body 100*a* is superposed on a screw hole of the OPU, and the components are fixed by a screw prepared in advance.

In this sequence of operations to assemble the tooth 100, problems rarely occur even without a handle because the tooth 100 is merely mounted from the bottom surface of the traverse chassis. However, in a case in which the tooth 100 is made thinner and the cover 100*j* is formed in an upside-down orientation in order to handle the reduced thickness, the tooth is difficult to install via the small opening 20*a* in the traverse chassis 20 because the fingers are brought up against the traverse chassis 20, and production efficiency is reduced.

The tooth 25 of the present invention can thus be easily attached, and a thin drive device for an optical disc apparatus can therefore be implemented without decreasing production efficiency.

The present invention can be used for an optical disc apparatus for recording on and playing a CD, DVD, BD, or the like. Examples include BD/DVD players, BD/DVD recorders, BD/DVD recorders integrated with a TV, personal computers provided with a BD/DVD recorder/player, and the like.

What is claimed is:

1. A drive device for an optical disc apparatus, comprising:
   an optical pickup;
   a guide shaft for movably supporting the optical pickup;
   a lead screw;
   a resin tooth fixed to the optical pickup, the tooth extending toward the lead screw in a cantilevered state, meshing cogs thereof being in meshed engagement with the lead screw, and the tooth being advanced following the rotation of the lead screw; and
   a traverse chassis for mounting the aforementioned members;
   wherein the tooth comprises a tooth body fixed to the optical pickup; support pieces projecting from the tooth body toward the lead screw; resin spring pieces having a base part on the projecting ends of the support pieces and extending in a direction orthogonal to the axial direction of the lead screw; a plate part provided with a base part on the extending ends of the resin spring pieces and formed in a direction parallel to the axial direction of the lead screw; meshing cogs formed on the plate part on the side near the lead screw; a cover projecting above the lead screw from the plate part disposed above the meshing cogs, straddling the lead screw, and bending sharply downward at a distal end; and a handle projecting from the tooth body.

2. The drive device for an optical disc apparatus according to claim 1, wherein the handle is arranged so as to be positioned in an opening in the traverse chassis when the tooth is attached.

3. The drive device for an optical disc apparatus according to claim 1, wherein the tooth is attached to the bottom surface of the optical pickup from the bottom surface of the traverse chassis.

* * * * *